Aug. 5, 1958     K. D. HOPPER, SR     2,846,073

LIQUID SEPARATION DECANTER

Filed Nov. 22, 1955

INVENTOR.
KERMIT D. HOPPER, SR.
BY
McMorrow, Berman & Davidson
ATTORNEYS

United States Patent Office 2,846,073
Patented Aug. 5, 1958

2,846,073

LIQUID SEPARATION DECANTER

Kermit Dwight Hopper, Sr., Wellington, Ill.

Application November 22, 1955, Serial No. 548,362

1 Claim. (Cl. 210—256)

The present invention relates to a liquid separation decanter for installation in a water disposal system.

An object of the present invention is to provide a liquid separation decanter for installation in a household water disposal system which has means for entrapping the lint carried by the water in the system.

Another object of the present invention is to provide a liquid separation decanter for installation in a household water disposal system which has means for entrapping the grease carried by the water in the system.

A further object of the present invention is to provide a liquid separation decanter for installation in a household water disposal system which is easily and quickly cleaned of entrapped lint and grease, one which is sturdy in construction, one which is economical to manufacture and assemble, and one which is highly effective in action.

Figure 1:
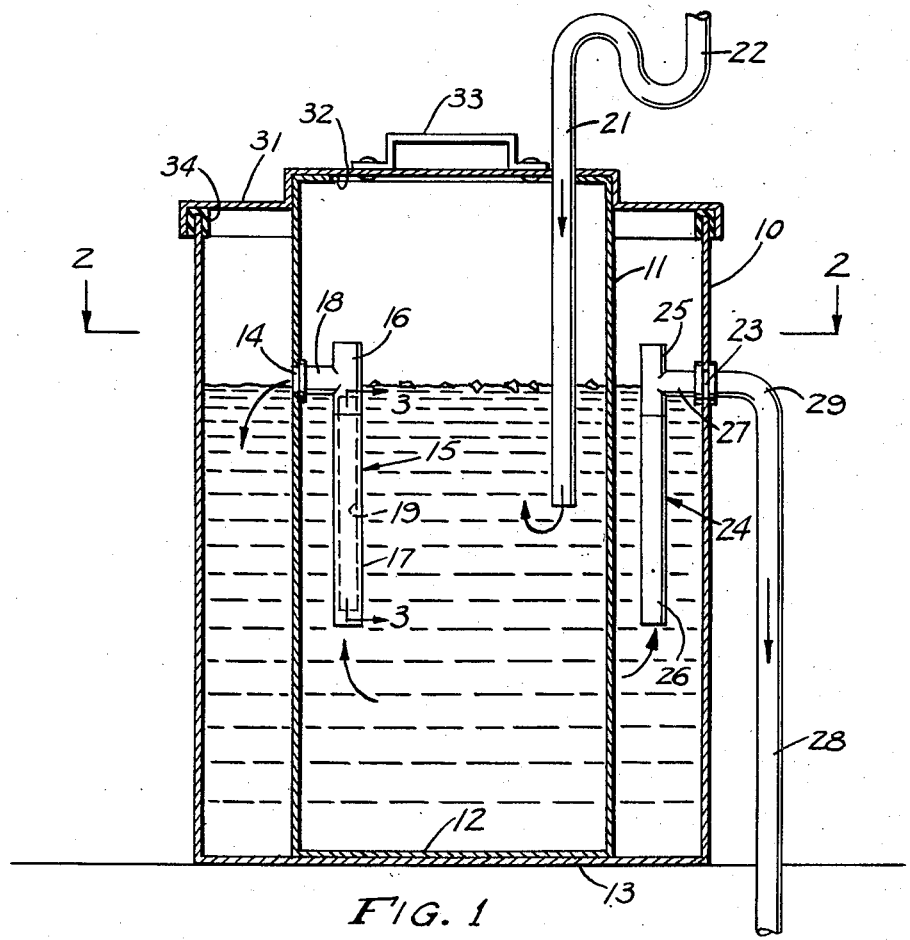
Figure 2:
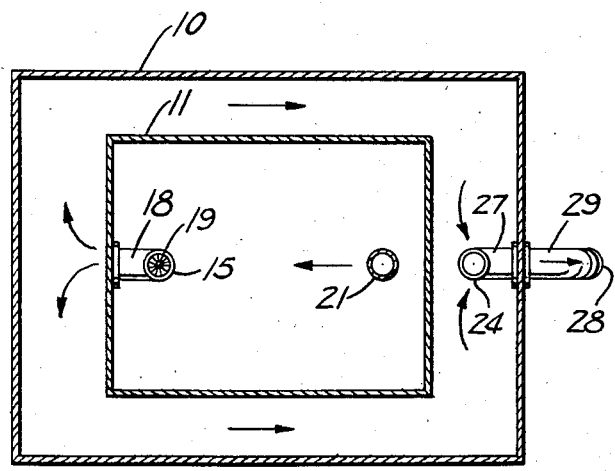
Figure 3:
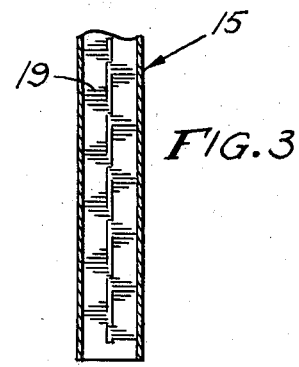

These and other objects and advantages of the present invention will be fully apparent from the following description when taken in connection with the annexed drawings, in which:

Figure 1 is an elevational sectional view of the liquid separation decanter of the present invention, Figure 2 is a sectional view taken on the line 2—2 of Figure 1, and Figure 3 is a sectional view, on an enlarged scale, taken on the line 3—3 of Figure 2.

Referring in greater detail to the drawing in which like numerals indicate like parts throughout the several views, the liquid separation decanter of the present invention comprises a first upstanding closed receptacle 10, a second upstanding closed receptacle 11 positioned within and spaced from the walls of the first receptacle 10 with its bottom 12 fixedly secured to the bottom 13 of the first receptacle 10.

An outlet 14 is disposed within the second receptacle 11 and extends through the wall of the second receptacle 11 adjacent to and spaced from the upper end of the second receptacle 11. An upstanding pipe 15 is positioned within the second receptacle 11 and has its upper end 16 spaced above the outlet 14. The lower end 17 of the pipe 15 is adjacent to and spaced above the bottom 12 of the receptacle 11. The pipe 15 is connected adjacent its upper end by means of a T-connection 18 in communication with the outlet 14.

A spirally shaped strainer 19 is positioned within the pipe 15 and extends from the lower end 17 to a point adjacent to and below the point of connection of the pipe 15 with the outlet 14, as seen most clearly in Figure 3. A section of the pipe 15 is shown in sectional view in Figure 3 with the strainer 19 installed therein.

An upstanding inlet conduit 21 is positioned within the receptacle 11 remote from the outlet 14 and has its upper end exteriorly of the receptacle 11 and has its lower end spaced above the lower end of the pipe 15. The upper end of the inlet conduit 21 is provided with a trap 22 and is adapted to be connected to a source of grease-contaminated water such as the kitchen sink, sewer pipe, or to an outlet for household or industrial liquid wastes.

Another outlet 23 is disposed within and extends through the wall of the first receptacle 10 intermediate the top and bottom of the latter and at the same level as the outlet 14. A second upstanding pipe 24 is positioned within the receptacle 10 exteriorly of the receptacle 11 and has its upper end 25 spaced above the other outlet 23 and has its lower end 26 adjacent to and spaced above the bottom 13 of the receptacle 10.

The pipe 24 is connected by means of another T-connection 27 adjacent its upper end in communication with the outlet 23. A discharge conduit 28 is positioned exteriorly of the receptacle 10 and has one end 29 connected in communication with the outlet 23 and has its other end (not shown) adapted to be connected in communication with a place of disposal, a septic tank, a sewer line, or other place for treatment of the water contained within the water system with which the liquid separation decanter of the present invention is intended to be used.

The upper end of the receptacle 11 extends above the upper end of the receptacle 10 and a cover 31 extends over the upper ends of the receptacles 10 and 11, there being provided a recess 32 in the cover receiving the upper end of the receptacle 11. A handle 33 is fixedly attached to the outer surface of the cover 31 and provides means for removing the cover 31 from the receptacles. A rubber gasket 34 of inverted U-shaped cross-sectional configuration overlies the upper end of the receptacle 10 and forms a seal for the receptacle 10 and the cover 31.

It has been found that the liquid separation decanter of the present invention is most useful as a grease trap for commercial and household use and when used with the household water disposal system it may be installed beneath the kitchen sink or exteriorly of the house in a place which is convenient for infrequent cleaning of the decanter.

It is an important feature that the lower end 17 of the pipe 15 be spaced above the bottom 12 of the receptacle 11 in order to provide room for the settling of solids contained in the water admitted through the inlet conduit 21. Also, the lower end of the inlet conduit 21 is preferably placed at a level higher than the level of the lower end 17 of the pipe 15 and as remotely within the receptacle 11 as is possible so that water as it is admitted to the receptacle 11 from the inlet conduit 21 is prevented in large part from surging into the lower end of the pipe 15 before the grease contained in the water has had a chance to rise to the surface of the water within the receptacle 11. The arrows in Figures 1 and 2 indicate the direction of flow of the water through the decanter.

When it is desired to clean the liquid separation decanter of the present invention, the cover 31 may be lifted and swung about the inlet conduit 21 to a position to expose the interior of the receptacle 11 and the strainer 19 may be lifted upwardly and out of the pipe 15 for cleaning. Grease accumulated upon the surface of the water within the receptacle 11 may be ladled out or removed with a skimming implement (not shown) or otherwise disposed of as desired.

What is claimed is:

A liquid separation decanter comprising a first upstanding closed receptacle, a second upstanding receptacle positioned within and spaced from said first receptacle and having the bottom thereof fixedly secured to the bottom of said first receptacle, an outlet disposed within and extending through the wall of said second receptacle adjacent to and spaced from the upper end of said second receptacle, a first upstanding pipe positioned within said second receptacle and having the upper end above said outlet and having the lower end adjacent to and spaced above the bottom of said second receptacle, said pipe being connected adjacent its upper end in communication with said outlet, a spirally-shaped strainer positioned within said first pipe extending from said lower end of the latter to a point adjacent to and below the point of connection of said first pipe with said outlet, an upstanding inlet conduit positioned within said second receptacle remote from said outlet and having the upper end exteriorly of said second receptacle and having the lower end spaced above the lower end of said pipe, another outlet disposed within and extending through the wall of said first receptacle intermediate the top and bottom of the latter and at the same level as said first-named outlet, a second upstanding pipe positioned within said first receptacle exteriorly of said second receptacle and having the upper end above said another outlet and having the lower end adjacent to and spaced above the bottom of said first receptacle, said second pipe being connected adjacent its upper end in communication with said another outlet, and a discharge conduit positioned exteriorly of said first receptacle and having one end connected in communication with said another outlet and having its other end adapted to be connected in communication with a place of disposal.

References Cited in the file of this patent

UNITED STATES PATENTS

| | | |
|---|---|---|
| 1,995,829 | Wise | Mar. 26, 1935 |
| 2,744,630 | Hughes | May 8, 1956 |

FOREIGN PATENTS

| | | |
|---|---|---|
| 68,050 | Switzerland | of 1914 |
| 300,408 | Great Britain | Nov. 15, 1928 |